United States Patent
Hu et al.

(10) Patent No.: US 12,231,452 B2
(45) Date of Patent: Feb. 18, 2025

(54) REMOTE ATTESTATION MODE NEGOTIATION METHOD FOR COMBINED DEVICE AND RELATED DEVICE

(71) Applicant: Huawei Technologies Co., Ltd., Shenzhen (CN)

(72) Inventors: Junli Hu, Nanjing (CN); Wei Pan, Nanjing (CN); Haifei Zeng, Nanjing (CN); Yuguo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 17/720,905

(22) Filed: Apr. 14, 2022

(65) Prior Publication Data
US 2022/0239688 A1 Jul. 28, 2022

Related U.S. Application Data

(63) Continuation of application No. PCT/CN2020/116934, filed on Sep. 22, 2020.

(30) Foreign Application Priority Data

Oct. 17, 2019 (CN) .......................... 201910990240.3
Nov. 8, 2019 (CN) .......................... 201911090276.2

(51) Int. Cl.
*H04L 9/40* (2022.01)
*G06F 1/3206* (2019.01)
(Continued)

(52) U.S. Cl.
CPC ........ *H04L 63/1433* (2013.01); *G06F 1/3206* (2013.01); *G06F 21/57* (2013.01); *G06F 21/606* (2013.01)

(58) Field of Classification Search
CPC . H04L 63/1433; H04L 9/3236; H04L 9/3263; G06F 1/3206; G06F 21/57; G06F 21/606
See application file for complete search history.

(56) References Cited

U.S. PATENT DOCUMENTS

| 5,784,566 A | 7/1998 | Viavant et al. |
| 9,276,905 B2 | 3/2016 | Coker, II et al. |

(Continued)

FOREIGN PATENT DOCUMENTS

| CN | 1658551 A | 8/2005 | |
| CN | 1859093 A | * 11/2006 | ............. H04L 63/08 |

(Continued)

OTHER PUBLICATIONS

H. Birkholz et al, "Architecture and Reference Terminology for Remote Attestation Procedures," draft-birkholz-rats-architecture-01, Mar. 12, 2019, 36 pages.

(Continued)

*Primary Examiner* — Sarah Su
(74) *Attorney, Agent, or Firm* — Conley Rose, P.C.

(57) ABSTRACT

A remote attestation mode negotiation method for a combined device and a related device, where the combined device includes at least a first unit. The method implemented by the first unit includes sending a mode negotiation request message to the remote attestation device; receiving a mode negotiation response message comprising a target remote attestation mode; and determining the remote attestation mode based on the mode negotiation response message. In this way, a target remote attestation manner to be used subsequently can be determined through negotiation between the combined device and the remote attestation device, to provide a data basis for subsequently and sequentially performing remote attestation on the combined device.

16 Claims, 10 Drawing Sheets

(51) Int. Cl.
  *G06F 21/57* (2013.01)
  *G06F 21/60* (2013.01)

(56) References Cited

U.S. PATENT DOCUMENTS

| | | |
|---|---|---|
| 11,546,165 B2 * | 1/2023 | Wood .................... G06F 21/44 |
| 2005/0132202 A1 | 6/2005 | Dillaway et al. |
| 2005/0210252 A1 | 9/2005 | Freeman et al. |
| 2008/0178004 A1 | 7/2008 | Wei et al. |
| 2010/0031047 A1 | 2/2010 | Coker, II et al. |
| 2010/0082984 A1 | 4/2010 | Ellison et al. |
| 2012/0011352 A1 | 1/2012 | Shimatani |
| 2012/0036553 A1 | 2/2012 | Xiao et al. |
| 2012/0131334 A1 | 5/2012 | Haikney et al. |
| 2012/0246470 A1 | 9/2012 | Nicolson et al. |
| 2016/0087882 A1 | 3/2016 | Bragg |
| 2016/0164862 A1 | 6/2016 | Berger et al. |
| 2016/0253664 A1 * | 9/2016 | Yuan ................ G06Q 20/3226 705/71 |
| 2017/0257365 A1 | 9/2017 | Gonzalez et al. |
| 2018/0136943 A1 | 5/2018 | Chew et al. |
| 2019/0042779 A1 | 2/2019 | Agerstam et al. |
| 2019/0114431 A1 | 4/2019 | Cheng et al. |
| 2019/0123903 A1 | 4/2019 | Fu et al. |
| 2020/0193375 A1 * | 6/2020 | Santangeli ......... G07C 9/00571 |
| 2020/0252503 A1 | 8/2020 | Li |
| 2020/0260278 A1 | 8/2020 | Du et al. |
| 2022/0116387 A1 * | 4/2022 | Pan .................... H04L 41/0246 |
| 2022/0237295 A1 * | 7/2022 | Hu ...................... H04L 9/3263 |

FOREIGN PATENT DOCUMENTS

| | | | |
|---|---|---|---|
| CN | 1859096 A * | 11/2006 | ............ G06F 21/42 |
| CN | 101043338 A | 9/2007 | |
| CN | 101477602 A | 7/2009 | |
| CN | 101610273 A | 12/2009 | |
| CN | 101951388 A | 1/2011 | |
| CN | 102271320 A | 12/2011 | |
| CN | 103501303 A | 1/2014 | |
| CN | 103560887 A | 2/2014 | |
| CN | 103841198 A | 6/2014 | |
| CN | 104969528 A | 10/2015 | |
| CN | 105159744 A | 12/2015 | |
| CN | 105227319 A | 1/2016 | |
| CN | 109005035 A | 12/2018 | |
| CN | 109669734 A | 4/2019 | |
| CN | 109714168 A | 5/2019 | |
| CN | 109729523 A | 5/2019 | |
| CN | 110309659 A | 10/2019 | |
| CN | 110321741 A | 10/2019 | |
| CN | 112688907 A * | 4/2021 | ........... G06F 1/3206 |
| EP | 4030681 A1 * | 7/2022 | ........... G06F 1/3206 |
| JP | H06261033 A | 9/1994 | |
| JP | 2005269656 A | 9/2005 | |
| JP | 2012253817 A | 12/2012 | |
| JP | 2016502373 A | 1/2016 | |
| WO | 2008126183 A1 | 10/2008 | |
| WO | 2010113266 A1 | 10/2010 | |
| WO | 2010118610 A1 | 10/2010 | |
| WO | 2014105994 A2 | 7/2014 | |
| WO | 2019084578 A1 | 5/2019 | |
| WO | WO-2020206260 A1 * | 10/2020 | ............ G06F 21/57 |
| WO | WO-2020259419 A1 * | 12/2020 | ............ G06F 21/57 |
| WO | WO-2021073375 A1 * | 4/2021 | ........... G06F 1/3206 |
| WO | WO-2022143429 A1 * | 7/2022 | ............ G06F 21/53 |
| WO | WO-2024006147 A1 * | 1/2024 | ........... G06F 21/554 |

OTHER PUBLICATIONS

H. Birkholz et al, "Yang Module for Basic Challenge-Response-based Remote Attestation Procedures," draft-birkholz-rats-basic-yang-module-01, Jul. 8, 2019, 36 pages.

H. Birkholz et al, "Reference Interaction Model for Challenge-Response-based Remote Attestation," draft-birkholz-rats-reference-interaction-model-00, Mar. 12, 2019, 9 pages.

H. Birkholz et al, "Reference Interaction Model for Challenge-Response-based Remote Attestation," draft-birkholz-rats-reference-interaction-model-01, Jul. 8, 2019, 13 pages.

Hu Hao et al, "Information-flow-based measurement architecture of trusted operating system," Journal of the Graduate School of the Chinese Academy of Sciences, vol. 26, No. 4, Jul. 2009, with the English Abstract, 8 pages.

Ma Na et al, "The Program about Security Protection of RTU Based on Trusted Computing," China Instrumentation, Issue 4, 2019, with the English Abstract, 4 pages.

Ge Cheng, "Unattended Remote Attestation Delegation for Grid Computing," IEEE International Conference on Networking, Architecture, and Storage, 2009, 4 pages.

Katsuno, Y., et al, "Layering Negotiations for Flexible Attestation," STC'06, Nov. 3, 2006, Alexandria, Virginia, USA, 4 pages.

\* cited by examiner

REMOTE ATTESTATION MODE NEGOTIATION METHOD FOR COMBINED DEVICE AND RELATED DEVICE

CROSS-REFERENCE TO RELATED APPLICATIONS

This application a continuation of International Patent Application No. PCT/CN2020/116934 filed on Sep. 22, 2020, which claims priority to Chinese Patent Application No. 201911090276.2 filed on Nov. 8, 2019 and Chinese Patent Application No. 201910990240.3 filed on Oct. 17, 2019. All of the aforementioned patent applications are hereby incorporated by reference in their entireties.

TECHNICAL FIELD

This application relates to the field of communications technologies, and in particular, to a remote attestation mode negotiation method for a combined device and a related device, to perform remote attestation on the combined device in a remote attestation mode determined through negotiation.

BACKGROUND

As remote attestation for system trustworthiness is applied to a wider range of scenarios, in a current case of the internet of everything, there are more network devices in a system such as an Internet of things (IoT), system trustworthiness of each network device is critical to the entire system, and these network devices include many combined network devices.

Based on this, to improve trustworthiness of the combined device, a remote attestation device may provide remote attestation for the combined device. However, the combined device and the remote attestation device each may usually support a plurality of remote attestation modes, but the combined device and the remote attestation device may not support exactly the same remote attestation modes. Therefore, to implement effective trusted verification between the combined device and the remote attestation device, the present disclosure provides a remote attestation mode negotiation method for a combined device.

SUMMARY

Based on this, embodiments of this application provide a remote attestation mode negotiation method for a combined device and a related device. The combined device and a remote attestation device determine a remote attestation mode through negotiation, to ensure that effective trusted verification can be implemented between the combined device and the remote attestation device.

In the embodiments of this application, the remote attestation device and the combined device may perform remote attestation in a plurality of remote attestation modes, for example, a relay mode, a proxy mode, or a hybrid verification mode. The combined device may include a router, a switch, or a packet transport network (PTN) device.

According to a first aspect, a remote attestation mode negotiation method for a combined device is provided. The combined device may include at least a first unit. A process in which the combined device and a remote attestation device determine, through negotiation, a remote attestation mode to be used for subsequent remote attestation may further include that the first unit sends a mode negotiation request message to the remote attestation device, the remote attestation device determines a target remote attestation mode with reference to a mode negotiation request, generates a mode negotiation response message, and sends the mode negotiation response message to the first unit, and the first unit may determine the remote attestation mode based on the mode negotiation response message. The mode negotiation request message may carry first indication information, and the first indication information is used to indicate a remote attestation mode supported and recommended by the first unit for use. The mode negotiation response message carries second indication information, and the second indication information is used to indicate that the remote attestation device determines a target remote attestation mode to be used subsequently. In this way, the remote attestation device determines, through negotiation between the combined device and the remote attestation device, a target remote attestation manner to be used subsequently, to provide a data basis for subsequently and sequentially performing remote attestation on the combined device.

It can be understood that, when the determined target remote verification mode is a proxy mode, in the proxy mode, the first unit is responsible for performing trusted verification on all units that include a trusted computing base (TCB) module and that are different from the first unit in the combined device. When the determined target remote attestation mode is a hybrid verification mode, in the hybrid verification mode, the first unit performs trusted verification on a second unit, and the remote attestation device performs trusted verification on a third unit in the combined device. In other words, the first unit performs trusted verification on some units in the combined device, the some units include a second unit. The other units send measurement information of the other units to the remote attestation device by using the first unit, the remote attestation device performs trusted verification, and the other units include a third unit. When the target remote attestation mode is a relay mode, the first unit is responsible for sending, to the remote attestation device, measurement information of all units that include a TCB module in the combined device, so that the remote attestation device performs trusted verification on each unit in the combined device.

It should be noted that, for the hybrid verification mode, a specific unit on which the remote attestation device and the first unit perform trusted verification may be determined by the first unit and notified to the remote attestation device, may be determined by the remote attestation device and notified to the first unit, or may be determined by the remote attestation device and the first unit through negotiation. A process of determining, through negotiation, specific units on which the remote attestation device and the first unit respectively perform verification may be implemented simultaneously in a remote attestation mode negotiation process, or may be separately negotiated about after it is determined that the remote attestation mode is a hybrid verification mode. In an example, in this embodiment of this application, for example, the specific unit on which the remote attestation device and the first unit perform trusted verification may be determined by using the following process. The first unit sends a first request message to the remote attestation device, where the first request message is used to request verification permission from the remote attestation device, the verification permission indicates a set of units on which the first unit performs trusted verification, and the set includes a second unit, and the first unit receives a first response message returned by the remote attestation device, where the first response message is used to indicate the verification permission. The first response message includes identification information of each unit on which the first unit performs trusted verification. The identification information may be, for example, an identifier of the unit, and is used to uniquely identify the unit. The first unit may be a control plane, and the second unit may be a control plane or a forwarding plane. For example, when the combined device is a router, the first unit may be a main control board.

According to a first aspect, another remote attestation mode negotiation method for a combined device is provided. The combined device may include at least a first unit. A process in which the combined device and a remote attestation device determine, through negotiation, a remote attestation mode to be used for subsequent remote attestation may include that the remote attestation device sends a mode negotiation request message to the first unit, the first unit determines a target remote attestation mode with reference to a mode negotiation request, generates a mode negotiation response message, and sends the mode negotiation response message to the remote attestation device, and the remote attestation device may determine the remote attestation mode based on the mode negotiation response message. In this way, the first unit determines, through negotiation between the combined device and the remote attestation device, a target remote attestation manner to be used subsequently, to provide a data basis for subsequently and sequentially performing remote attestation on the combined device.

It can be understood that, when the determined target remote verification mode is a proxy mode, in the proxy mode, the first unit is responsible for performing trusted verification on all units that include a TCB module and that are different from the first unit in the combined device. When the determined target remote attestation mode is a hybrid verification mode, in the hybrid verification mode, the first unit performs trusted verification on a second unit, and the remote attestation device performs trusted verification on a third unit in the combined device. In other words, the first unit performs trusted verification on some units in the combined device, the some units include a second unit. The other units send measurement information of the other units to the remote attestation device by using the first unit, the remote attestation device performs trusted verification, and the other units include a third unit. When the target remote attestation mode is a relay mode, the first unit is responsible for sending, to the remote attestation device, measurement information of all units that include a TCB module in the combined device, so that the remote attestation device performs trusted verification on each unit in the combined device.

It should be noted that, for the hybrid verification mode, a specific unit on which the remote attestation device and the first unit perform trusted verification may be determined by the first unit and notified to the remote attestation device, may be determined by the remote attestation device and notified to the first unit, or may be determined by the remote attestation device and the first unit through negotiation. A process of determining, through negotiation, specific units on which the remote attestation device and the first unit respectively perform verification may be implemented simultaneously in a remote attestation mode negotiation process, or may be separately negotiated about after it is determined that the remote attestation mode is a hybrid verification mode. In an example, in this embodiment of this application, for example, the specific unit on which the remote attestation device and the first unit perform trusted verification may be determined by using the following process. The remote attestation device sends a first request message to the first unit, where the first request message is used to request verification permission from the first unit, the verification permission indicates a set of units on which the first unit performs trusted verification, and the set includes a second unit, and the remote attestation device receives a first response message returned by the first unit, where the first response message is used to indicate the verification permission. The first response message includes identification information of each unit on which the first unit performs trusted verification. The identification information may be, for example, an identifier of the unit, and is used to uniquely identify the unit. The first unit may be a control plane, and the second unit may be a control plane or a forwarding plane. For example, when the combined device is a router, the first unit may be a main control board.

It should be noted that the remote attestation mode negotiation process may be initiated by the first unit, or may be initiated by the remote attestation device. A finally determined target remote attestation mode may be determined by the first unit, or may be determined by the remote attestation device. In an example, the remote attestation mode to be used for subsequent remote attestation may be determined by performing local static configuration on the combined device and the remote attestation device.

According to a third aspect, an embodiment of this application further provides a remote attestation mode negotiation apparatus for a combined device, applied to the combined device. The combined device includes a receiving unit, a sending unit, and a processing unit. The receiving unit is configured to perform a receiving operation in the method provided in the first aspect. The sending unit is configured to perform a sending operation in the method provided in the first aspect. The processing unit is configured to perform an operation other than the receiving operation and the sending operation in the first aspect. For example, the processing unit may perform an operation in the embodiment of the first aspect, where the first unit determines a remote attestation mode based on a mode negotiation response message.

According to a fourth aspect, an embodiment of this application further provides a remote attestation mode negotiation apparatus for a combined device, applied to the remote attestation device. The remote attestation device includes a receiving unit, a sending unit, and a processing unit. The receiving unit is configured to perform a receiving operation in the method provided in the second aspect. The sending unit is configured to perform a sending operation in the method provided in the second aspect. The processing unit is configured to perform an operation other than the receiving operation and the sending operation in the second aspect. For example, the processing unit may perform an operation in the embodiment of the second aspect, where the remote attestation device determines a remote attestation mode based on a mode negotiation response message.

According to a fifth aspect, an embodiment of this application further provides a combined device, including a communications interface and a processor. The communications interface is configured to perform a receiving operation and a sending operation in the method provided in the first aspect. The processor is configured to perform an operation other than the receiving operation and the sending operation in the method provided in the first aspect.

According to a sixth aspect, an embodiment of this application further provides a combined device. The combined device includes a memory and a processor. The memory is configured to store program code. The processor is configured to execute instructions in the program code, so that the combined device performs the method provided in the first aspect.

According to a seventh aspect, an embodiment of this application further provides a remote attestation device. The remote attestation device includes a communications interface and a processor. The communications interface is configured to perform a receiving operation and a sending operation in the method provided in the second aspect. The processor is configured to perform an operation other than the receiving operation and the sending operation in the method provided in the second aspect.

According to an eighth aspect, an embodiment of this application further provides a remote attestation device. The remote attestation device includes a memory and a processor. The memory is configured to store program code. The processor is configured to execute instructions in the program code, so that the remote attestation device performs the method provided in the second aspect.

According to a ninth aspect, an embodiment of this application further provides a computer-readable storage medium. The computer-readable storage medium stores instructions. When the instructions run on a computer, the computer is enabled to perform the remote attestation mode negotiation method for a combined device according to the first aspect or the second aspect.

According to a tenth aspect, an embodiment of this application further provides a computer program product. When the computer program product runs on a computer, the computer is enabled to perform the remote attestation mode negotiation method for a combined device according to the first aspect or the second aspect.

According to an eleventh aspect, an embodiment of this application further provides a communications system, including the combined device according to the fifth aspect or the sixth aspect and the remote attestation device according to the seventh aspect or the eighth aspect.

BRIEF DESCRIPTION OF DRAWINGS

To describe technical solutions in some embodiments of this application more clearly, the following briefly describes the accompanying drawings for describing some of the embodiments. It is clear that the accompanying drawings in the following description show merely some embodiments of this application, and a person of ordinary skill in the art may derive other drawings from these accompanying drawings.

DESCRIPTION OF EMBODIMENTS

To describe the embodiments of this application more clearly, before the embodiments of this application are described, some basic concepts and processes of trusted verification are briefly described first.

It may be understood that a network device has a trusted platform module (TPM). The TPM has a component of trust (or a root of trust) that cannot be tampered with, is absolutely trusted, and does not require external maintenance, and the root of trust is an indispensable part of trustworthiness verification.

System trustworthiness verification of a network device may further include that the TPM in the network device performs trustworthiness measurement on a system status such as a system boot process, a process running process, and a configuration file on the network device, to obtain system trustworthiness measurement information, and verifies, based on the measurement information, whether a system of the network device may be trusted.

Figure 1:
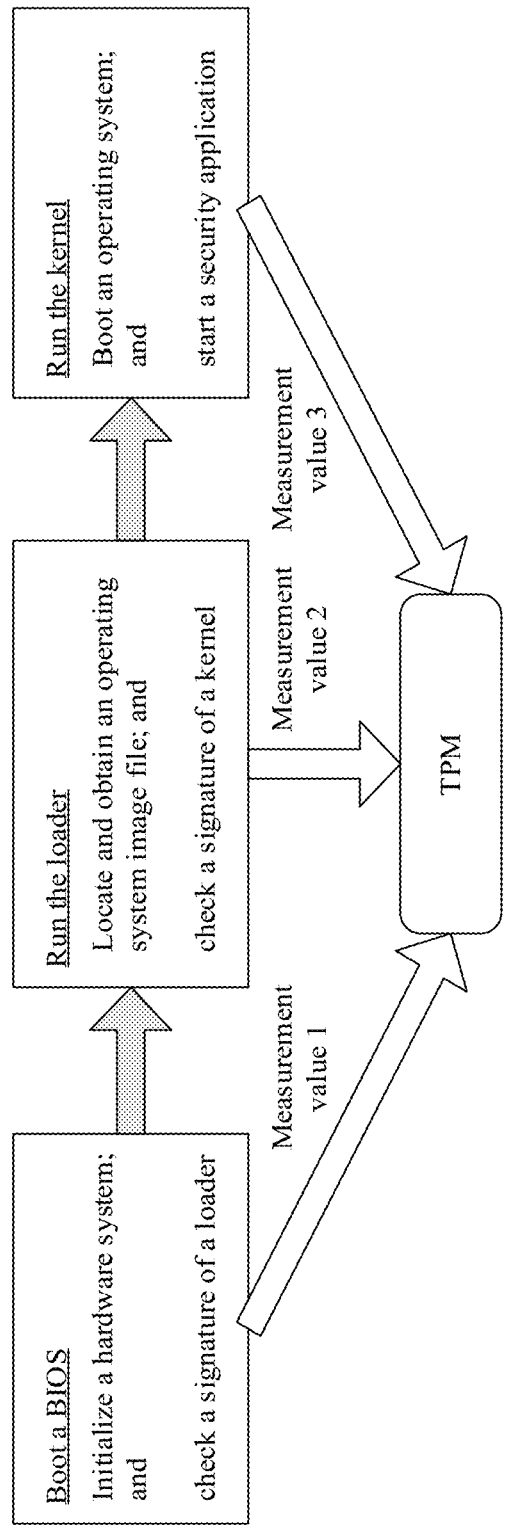
FIG. 1 is a schematic diagram of a structure of a trustworthiness attestation process during measurement startup according to an embodiment of this application.

In an example, referring to a boot model shown in FIG. 1, in a boot process, a system trustworthiness verification process of the network device may include, for example, the following steps: Step 1: The root of trust in the TPM provides a trust basis for a basic input/output system (BIOS). Step 2: Boot the BIOS, initialize a hardware system, invoke the root of trust in the TPM to check a signature of a loader to run in a next stage, measure the loader and configuration information, and record the measurement information in the TPM. Step 3: Run the loader, locate and obtain an operating system image file, invoke the root of trust in the TPM to check a signature of a kernel of an operating system to run in a next stage, measure the kernel, and record measurement information in the TPM. Step 4: Run the kernel, boot the operating system, start a security application, and the like, measure the configuration information, and record the measurement information in the TPM. It can be learned that when the network device is booted, remote attestation may be performed. To be specific, the network device generates a report based on the measurement information recorded in the TPM, and sends the report to a server with a remote attestation function, and the server performs trusted verification on a boot process of the network device based on the received report, to obtain a verification result. The measurement information may include at least a platform configuration register (PCR) value calculated on the TPM and stored in a PCR. The PCR value is usually a value obtained after a baseline value is extended for a plurality of times in a running process, and is further related to a quantity of extensions and an extension sequence in the running process.

It can be understood that remote attestation means that a network device on which trusted verification is to be performed sends the measurement information to the server, and the server performs, based on the received measurement information, remote attestation on the network device on which trusted verification is to be performed. Because the network device is centrally monitored more easily through remote attestation, system trustworthiness verification is performed on more network devices through remote attestation. Remote attestation for the network device may include, for example, the server with a remote attestation function performs remote attestation on measurement information generated in a determined measurement process such as boot of the network device. In addition, the server with a remote attestation function performs remote attestation on measurement information generated in a dynamic process in a running process of the network device.

Figure 2:
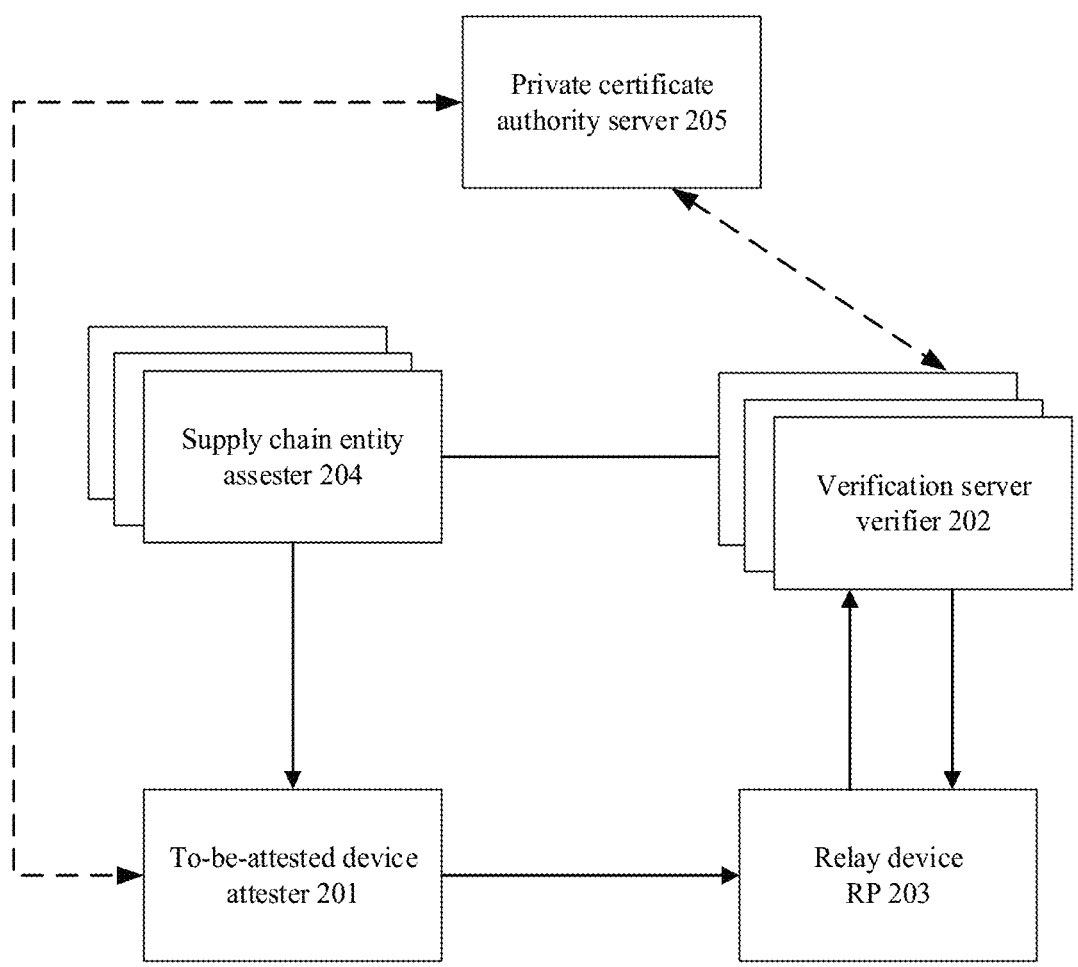
FIG. 2 is a schematic diagram of a framework of remote attestation in an application scenario according to an embodiment of this application.

Refer to the network model shown in FIG. 2. The model shows a scenario of remote attestation. The scenario includes a to-be-attested device attester 201, a verification server verifier 202, a relay device relying party (RP) 203, and a supply chain entity asserter 204. The attester 201 is a network device on which remote attestation needs to be performed, for example, a terminal, an IoT gateway, or an application server. The terminal may be, for example, a switch, a router, or a personal computer (PC). The attester 201 may internally include four parts: a central processing unit (CPU) & TPM, a basic input/output system (BIOS), a kernel, and an application (APP), is configured to calculate and record measurement information, and can also be referred to as an attestation platform. The verifier 202 is a server with a remote attestation function, and may also be referred to as an attestation server. The RP 203 is a device that may communicate with the attester 201 and the verifier 202 and is responsible for information interaction between the attester 201 and the verifier 202, for example, may be a network management device. The supply chain entity the asserter 204 may be, for example, a network device of a device manufacturer.

In a specific implementation, a process in which the verifier 202 performs remote attestation on the attester 201 may further include: S11: The attester 201 calculates and collects measurement information of the attester 201 by using a root of trust, and provides the measurement information to the RP 203. S12: The RP 203 receives the measurement information sent by the attester 201, and verifies an identity of the attester 201 in a signature authentication manner. S13: After verification performed by the RP 203 on the identity of the attester 201 succeeds, the RP 203 signs the measurement information of the attester 201 by using a certificate of the RP 203, and sends the measurement information and a signature of the measurement information to the verifier 202. S14: After verification performed by the verifier 202 on an identity of the RP 203 succeeds, the verifier 202 verifies, based on the measurement information, whether the attester 201 may be trusted, and sends a verification result to the RP 203, so that a customer or a technical person can learn of a system trustworthiness status of the attester 201. Before S14, the asserter 204 is configured to provide configuration information such as an initial device ID for the attester 201, and a baseline value and a PCR reference value of the attester 201 also exist in the asserter 204. The asserter 204 may send the baseline value and the PCR reference value of the attester 201 to the verifier 202, and use the baseline value and the PCR reference value of the attester 201 as a basis for remote attestation to be performed by the verifier 202 on the attester 201. The baseline value is a digest obtained by performing hash calculation on a software package in the attester 201, and is usually a fixed value. The PCR reference value is a value obtained after the baseline value is extended for a determined quantity of times in a determined sequence in a determined measurement process such as boot, and is used as a standard for trusted verification in the determined measurement process.

It should be noted that, to ensure device and communication security in an entire remote attestation interaction process, it may be considered, by default, that the verifier in this embodiment of this application is an absolutely secure and trusted device. In other words, the verifier is qualified to perform trusted verification on the network device. In addition, a certificate mechanism (including certificate application and revocation, and the like) needs to be predeployed, to support necessary operations such as certificate verification and viewing in the interaction process. Further, the attester 201 uses a certificate obtained by applying to a private certificate authority (CA) server 205, and encrypts and signs measurement information recorded by the attester 201. The verifier 202 decrypts received information, and interacts with the private certificate authority server 205, to verify whether the certificate of the attester 201 is valid. A user may view a certificate externally issued by the private certificate authority server 205, and may view a result of performing remote attestation on the attester 201 by the verifier 202.

The server with a remote attestation function (the verifier is used as an example for description below) may perform remote attestation on a network device (the attester is used as an example for description below) in a challenge-response manner in a Network Configuration Protocol (NETCONF). Related information of remote attestation may be described by using a Yet Another Next Generation (YANG) data model.

It should be noted that, in this embodiment of this application, the verifier is a device that is responsible for performing remote attestation on the attester. In one case, the verifier may be a device on which functions of both the RP 203 and the verifier 202 are deployed. In another case, the verifier may also be a device that has a function of directly interacting with the attester 201. In other words, the attester 201 in this embodiment of this application only needs to focus on the verifier 202. In subsequent descriptions, an information exchange process between the RP 203 and the attester 201 and an information exchange process between the RP 203 and the verifier 202 are not described, and only direct interaction between the attester 201 and the verifier 202 is described.

It should be noted that for related descriptions in this embodiment of this application, refer to related descriptions of draft-birkholz-rats-architecture-01 and draft-birkholz-rats-reference-interaction-model-00.

A network device in many scenarios includes a plurality of independent components or units (referred to as units below), and is referred to as a combined device, for example, a switch or a router. A TCB module is built in some units of the combined device, and the other units do not include a TCB module. The TCB module is equivalent to the TPM in the network device, and is configured to compute and record a system boot process, a process running process, a configuration file, and the like on a unit in which the TCB module is located, to obtain measurement information that represents trustworthiness. Only a unit in which a TCB module is built can generate measurement information and trusted verification needs to be performed on the unit, but a unit that does not include a TCB module does not affect trusted verification performed by the combined device. Therefore, a unit in the combined device in this embodiment of this application is further a unit in which a TCB module is built, and does not include a unit that does not include a TCB module.

The combined device may include a leader unit and a subsidiary unit. The leader unit includes a communications interface that may be used to directly interact with an external device, the subsidiary unit does not include a communications interface that may be used to directly interact with the external device, and the subsidiary unit needs to interact with the external device by using an internal interconnection structure and the communications interface of the leader unit. It can be understood that the communications interface is a physical interface that can implement communication with the external device, for example, may be a management interface. For example, the combined device is a router. The router is connected to a network management system through the management interface, and the router may interact with the network management system through the management interface. For example, the router delivers configuration information to the network management system through the management interface, and the network management system queries a running status of the router through the management interface.

For example, when the combined device is a router, the leader unit may be a main control board of the router. To improve reliability of the router, two main control boards are usually deployed in the router. One main control board is in an active state (that is, a working state). When the main control board in the active state is unavailable, another main control board in a standby state may take over from the original main control board in the active state. In this way, the router does not entirely restart or break down because one main control board is unavailable, and running of an entire network is not affected. The subsidiary unit may refer to a plug-in card, a base card, a line card, or a value-added service board of the router. The line card may usually be a forwarding board, the plug-in card may be a subcard extended on the forwarding board, and the base card is a basic forwarding unit. The value-added service board is for example, a service board that provides Internet Protocol (IP) Security (IPSec).

Figure 3:
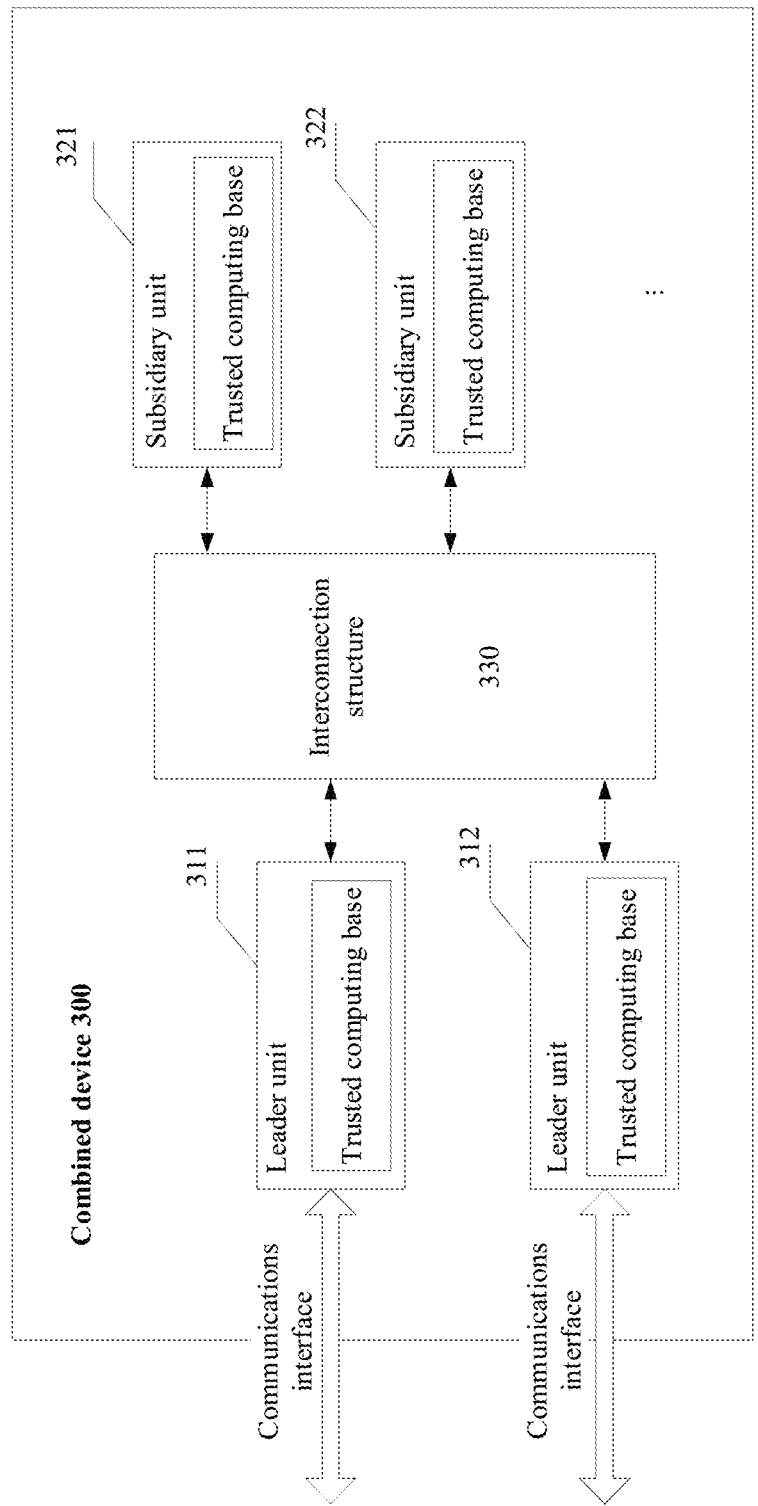
FIG. 3 is a schematic diagram of a structure of a combined device according to an embodiment of this application.

FIG. 3 is a schematic diagram of a combined device. A combined device 300 may include a leader unit 311, a leader unit 312, and a plurality of subsidiary units 321, 322, and the like. The leader unit 311 and the leader unit 312 each include a communications interface that may be used to directly interact with an external device and each are integrated with a TCB module. The subsidiary units 321, 322, and the like each are integrated with a TCB module, but do not include a communications interface that may be used to directly interact with the external device, and can interact with the external device by using only an internal interconnection structure 330 and a communications interface of the leader unit 311 or the leader unit 312.

A behavior of boot, running, or the like of the combined device includes a behavior of boot, running, or the like of each leader unit and each subsidiary unit. Therefore, trustworthiness of the leader unit and each subsidiary unit included in the combined device needs to be verified respectively, to verify system trustworthiness of the combined device. Only when the leader unit and each subsidiary unit are trusted, it can be determined that a system of the combined device is trusted.

To perform remote attestation on the combined device more flexibly, a plurality of remote attestation modes is provided, for example, a relay mode, a proxy mode, and a hybrid verification (mixed) mode. In the relay mode, a remote attestation device performs trusted verification on all units that include a TCB module in the combined device. In the proxy mode, the leader unit in the combined device performs trusted verification on all units in the combined device other than the leader unit. In the hybrid verification mode, the leader unit in the combined device performs trusted verification on some units in the combined device, and the remote verification device performs trusted verification on other units in the combined device.

The combined device and the remote attestation device each may usually support a plurality of remote attestation modes, but remote attestation modes supported by the combined device and the remote attestation device may not be exactly the same. Therefore, to achieve effective trusted verification between the combined device and the remote attestation device, the remote attestation device and the combined device need to perform remote attestation in a same remote attestation mode. In other words, before the combined device and the remote attestation device perform remote attestation, a remote attestation mode to be used by the combined device and the remote attestation device needs to be determined. For example, the combined device supports the proxy mode, the hybrid verification mode, and the relay mode, and the remote attestation device supports the proxy mode and the relay mode. Before remote attestation is performed between the combined device and the remote attestation device, it needs to be determined that the remote attestation mode to be used by the combined device and the remote attestation device is a proxy mode or a relay mode.

Usually, in a manner, on the combined device and the remote attestation device, a specific remote attestation mode may be statically configured by a technical person manually or in advance, so that the combined device and the remote attestation device perform remote attestation in the configured remote attestation mode. When the remote attestation mode needs to be switched, a new remote attestation mode may be reconfigured, and the newly configured remote attestation mode is used to perform remote attestation on the combined device. However, when there are more combined devices, and remote attestation is to be performed on more units in the combined device, the remote attestation mode is determined in the static configuration manner. Consequently, there is a steep increase in manual costs, and a process of determining the remote attestation mode is not flexible and fast enough.

Based on this, in this embodiment of this application, before remote attestation is performed, a to-be-verified combined device and the remote attestation device negotiate, and the to-be-verified combined device and the remote attestation device may determine, through negotiation from a remote attestation mode supported by both the to-be-verified combined device and the remote attestation device, a remote attestation mode to be used for subsequent remote attestation between the combined device and the remote attestation device, without a need to manually perform static configuration of the remote attestation mode on the combined device and the remote attestation device, to greatly reduce manual costs of determining the remote attestation mode. In addition, according to the method for automatically negotiating about the remote attestation mode, the remote attestation mode is configured more flexibly when there is a large quantity of combined devices.

It can be understood that the scenario shown in FIG. 2 is merely an example of the scenario provided in this embodiment of this application, and this embodiment of this application is not limited to this scenario.

With reference to the accompanying drawings, the following describes in detail a specific implementation of a remote attestation mode negotiation method for a combined device in the embodiments of this application by using embodiments.

Figure 4:
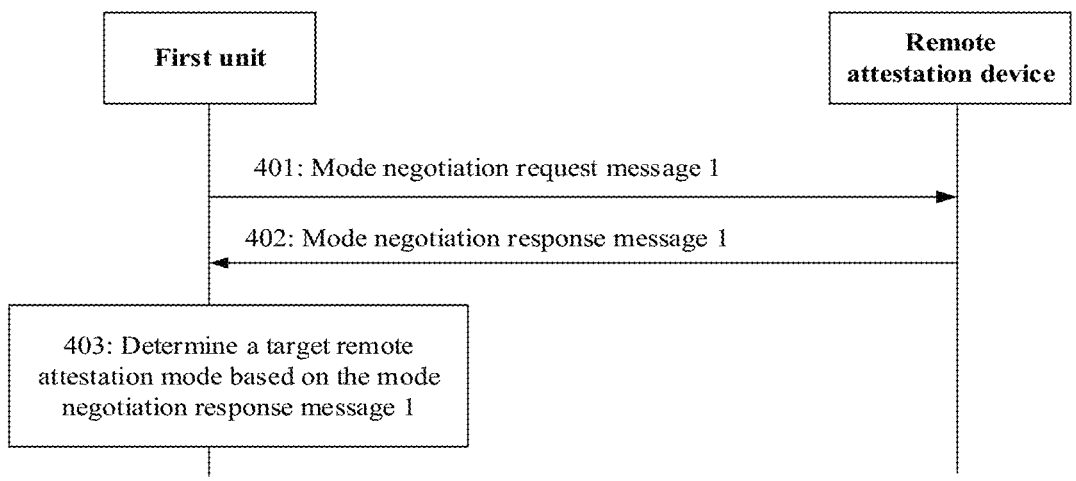
FIG. 4 is a signaling flowchart of a remote attestation mode negotiation method for a combined device according to an embodiment of this application.

FIG. 4 is a signaling flowchart of a remote attestation mode negotiation method for a combined device according to an embodiment of this application. Referring to FIG. 4, the method is applied to a network including the combined device and a remote attestation device, for example, the attester 201 and the verifier 202 shown in FIG. 2, and it is learned that the combined device includes a first unit. The first unit may be a leader unit 311 in an active state in the combined device 300 in FIG. 3. In this method, the remote attestation device determines a target remote attestation mode. This method may include the following steps.

Step 401: The first unit sends a mode negotiation request message 1 to the remote attestation device.

Step 402: The remote attestation device feeds back a mode negotiation response message 1 to the first unit.

Step 403: The first unit determines the target remote attestation mode based on the mode negotiation response message 1.

It can be understood that the mode negotiation request message 1 is used to request, from the remote attestation device, the target remote attestation mode to be used for subsequent remote attestation, and the mode negotiation response message 1 may carry the target remote attestation mode in response to the mode negotiation request message 1, and is used to notify the first unit of the determined target remote attestation mode. The target remote attestation mode may be a relay mode, a proxy mode, or a hybrid verification mode.

In an example, the mode negotiation request message 1 may carry a candidate remote attestation mode, and the mode negotiation request message 1 is used to request the remote attestation device to determine the target remote attestation mode with reference to the candidate remote attestation mode. The candidate remote attestation mode may be at least one of the following modes: the relay mode, the proxy mode, and the hybrid verification mode. The candidate remote attestation mode is a remote attestation mode that is supported by the first unit and recommended for use. After the remote attestation device receives the mode negotiation request message 1, the remote attestation device may determine the to-be-used target remote attestation mode with reference to the candidate remote attestation mode, or the remote attestation device may not consider the candidate remote attestation mode, and independently determine the to-be-used target remote attestation mode.

In another example, the mode negotiation request message 1 may not carry any candidate remote attestation mode. In other words, the mode negotiation request message 1 is only used to request the remote attestation device to determine the target remote attestation mode. Therefore, it may be considered, by default, that the first unit supports any remote attestation mode, and the remote attestation device independently determines a remote attestation mode. In this case, the remote attestation device may determine the to-be-used target remote attestation mode based on a requirement and a capability of the remote attestation device.

After determining the to-be-used target remote attestation mode, the remote attestation device may generate the mode negotiation response message 1 based on the target remote attestation mode, and feed back the mode negotiation response message 1 to the first unit. Usually, the first unit parses the mode negotiation response message 1, to determine the to-be-used target remote attestation mode.

Therefore, in the foregoing negotiation manner, the remote attestation device may determine the target remote attestation mode to be used between the remote attestation device and the combined device, and notify the target remote attestation mode to the first unit of the combined device, to determine the target remote attestation mode between the first unit and the remote attestation device, so that the remote attestation device and the combined device can perform effective remote attestation based on the target remote attestation mode, in other words, provide a data basis for performing effective remote attestation on the combined device.

Figure 5:
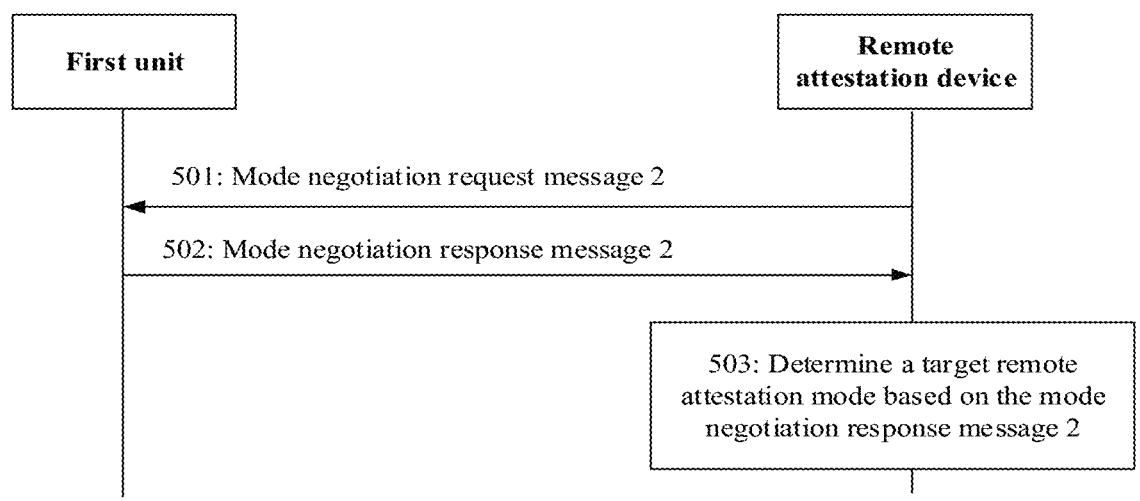
FIG. 5 is a signaling flowchart of another remote attestation mode negotiation method for a combined device according to an embodiment of this application.

FIG. 5 is a signaling flowchart of another remote attestation mode negotiation method for a combined device according to an embodiment of this application. Referring to FIG. 5, the method is applied to a network including the combined device and a remote attestation device, for example, the attester 201 and the verifier 202 shown in FIG. 2, and it is learned that the combined device includes a first unit. The first unit may be a leader unit 311 in an active state in the combined device 300 in FIG. 3. In this method, the first unit in the combined device determines a target remote attestation mode. This method may include the following steps.

Step 501: The remote attestation device sends a mode negotiation request message 2 to the first unit.

Step 502: The first unit feeds back a mode negotiation response message 2 to the remote attestation device.

Step 503: The remote attestation device determines the target remote attestation mode based on the mode negotiation response message 2.

It should be noted that in this embodiment, only an execution body of each step in FIG. 4 is changed, and the first unit determines a target remote attestation mode to be used between the first unit and the remote attestation device. Therefore, for a specific implementation and a related description in this embodiment of this application, refer to related descriptions in FIG. 4.

Therefore, in the foregoing negotiation manner, the first unit in the combined device may determine the target remote attestation mode to be used between the first unit and the remote attestation device, and notify the target remote attestation mode to the remote attestation device, to determine the target remote attestation mode between the first unit and the remote attestation device, so that the remote attestation device and the combined device can perform effective remote attestation based on the target remote attestation mode, in other words, provide a data basis for performing effective remote attestation on the combined device.

In an example, when the target remote attestation mode is a relay mode, the first unit is responsible for sending, to the remote attestation device, measurement information of all units that include a TCB module in the combined device, so that the remote attestation device performs trusted verification on each unit in the combined device.

In another example, when the target remote attestation mode is a hybrid verification mode, the first unit is responsible for performing trusted verification on a second unit, and the remote attestation device performs trusted verification on a third unit. The second unit and the third unit are units that include a TCB module in the combined device. The second unit is a unit in a set of units on which the first unit is responsible for performing trusted verification, and similarly, the third unit is a unit in a set of units on which the remote attestation device is responsible for performing trusted verification. Therefore, the first unit in the combined device may perform local trusted verification on some units in the combined device, and the remote attestation device performs trusted verification on the other units. In this case, the remote attestation device does not need to perform trusted verification on all units in the combined device, to lighten a load of the remote attestation device to an extent, reduce an amount of data exchanged between the combined device and the remote attestation device, and save a network resource.

In still another example, when the determined target remote attestation mode is a proxy mode, the first unit is responsible for performing trusted verification on all units that include a TCB module and that are different from the first unit in the combined device. In this case, the first unit in the combined device may perform trusted verification on the other units in the combined device, and send a verification result to the remote attestation device. The first unit does not need to send measurement information of the other units to the remote attestation device, so that the remote attestation device separately performs trusted verification on all units, to greatly reduce an amount of data exchanged between the combined device and the remote attestation device in a process of performing trusted verification on the combined device, lighten a load of the remote attestation device, and improve efficiency of performing remote attestation by the combined device.

In the hybrid verification mode, units on which the first unit and the remote attestation device are respectively responsible for performing trusted verification may be determined in the following three possible implementations.

In a possible implementation, identification information of a unit may be preconfigured on the first unit, and includes identification information of the second unit, to indicate a set of units on which the first unit needs to perform trusted verification in the hybrid verification mode. The set includes the second unit. Similarly, the identification information of the unit is also preconfigured on the remote attestation device, and includes identification information of the third unit, to indicate a set of units on which the remote attestation device needs to perform trusted verification in the hybrid verification mode. The set includes the third unit. In this case, in the hybrid verification mode, the first unit and the remote attestation device can determine the units on which the first unit and the remote attestation device are respectively responsible for performing trusted verification, without a need to perform additional negotiation, to reduce time in which respectively responsible units are negotiated about when the target remote attestation mode is a hybrid verification mode, so that remote attestation is performed more efficient in this mode.

The identification information may include an identifier of a unit, and is used to uniquely identify the unit. The identifier of the unit may include, for example, an index of the unit, or a name of the unit. The index of the unit may be a definition of the unit in a YANG document, may be represented by using a number, and may be used as a physical index to uniquely identify the unit. The name of the unit is represented by using a character string. Therefore, it can be more quickly to determine a corresponding unit based on the index of the unit than determining the corresponding unit based on the name of the unit. Further, the identification information of the unit may further include version information of the unit, and the version information of the unit may indicate a software version number and/or a type of the unit (for example, a card model).

In another possible implementation, when the mode negotiation request message includes a candidate remote attestation mode, and the candidate remote attestation mode includes a hybrid verification mode, to reduce time consumed for remote attestation and improve efficiency of remote attestation, the units on which the remote attestation device and the first unit are respectively responsible for performing trusted verification in the hybrid verification mode may be determined through negotiation when the remote attestation mode is determined through negotiation. For example, the mode negotiation request message 1 may further carry a set of candidate units on which the first unit is to perform trusted verification. Similarly, when the remote attestation device determines that a to-be-used target remote attestation mode is a hybrid verification mode, the mode negotiation response message 1 may further carry a set of units that are determined by the remote attestation device and on which the first unit is responsible for performing trusted verification.

Figure 6:
FIG. 6 is a signaling flowchart of a verification permission negotiation method in a hybrid verification mode according to an embodiment of this application.

In still another possible implementation, the remote attestation device and the first unit may separately perform negotiation, to determine the units on which the remote attestation device and the first unit are respectively responsible for performing trusted verification. Referring to FIG. 6, the following steps may be included.

Step 601: The first unit sends a first request message to the remote attestation device, where the first request message is used to request verification permission from the remote attestation device, and the verification permission indicates a set of units on which the first unit performs trusted verification.

Step 602: The first unit receives a first response message returned by the remote attestation device, where the first response message is used to indicate the verification permission.

The verification permission may indicate that the remote attestation device is requested to specify a set of units on which the first unit may perform trusted verification in all units of the combined device in the hybrid verification mode. The first unit may learn, based on the verification permission sent by the remote attestation device, of a specific unit on which the first unit is responsible for performing trusted verification. The specific unit may include the second unit.

It can be understood that, the first request message may carry identification information 1 of a set 1 of units in the combined device, so that the remote attestation device determines, from the set 1 of units, a subset on which the first unit is to perform trusted verification. The subset includes the second unit. Alternatively, the first request message may carry a set 2 of candidate units on which the first unit determines to perform trusted verification, to provide reference for the remote attestation device to determine a subset on which the first unit is to perform trusted verification. The subset indicated in the first response message is not limited to a range of the set 2 of candidate units. In one case, units included in the subset may be all or some units in the set 2 of candidate units. In another case, units in the subset may further include another unit that does not belong to the set 2 of candidate units. It should be noted that, when the first response message does not carry identification information of a unit, it may be considered that the first unit is indicated to perform trusted verification on all other units. In a specific implementation in this case, subsequent remote verification may be performed on the combined device in the proxy mode.

Figure 7:
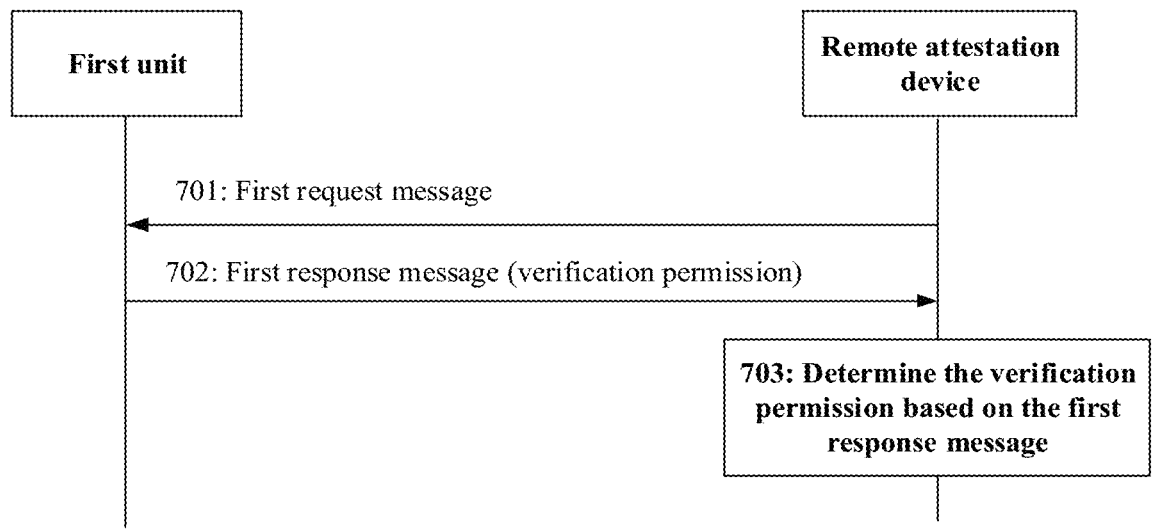
FIG. 7 is a signaling flowchart of another verification permission negotiation method in a hybrid verification mode according to an embodiment of this application.

It should be noted that, in the implementation shown in FIG. 6, the first unit may alternatively determine the verification permission. To be specific, in this embodiment of this application, an execution body of each step in FIG. 6 may be changed. Referring to FIG. 7, the following steps may be included.

Step 701: The remote attestation device sends a first request message to the first unit, where the first request message is used to request verification permission from the first unit, and the verification permission indicates a set of units on which the first unit performs trusted verification.

Step 702: The remote attestation device receives a first response message sent by the first unit.

Step 703: The remote attestation device determines the verification permission based on the first response message.

For specific descriptions of the embodiment shown in FIG. 7, refer to related descriptions of the embodiment shown in FIG. 6.

It should be noted that, in one case, provided that it is determined that the target remote attestation mode is a hybrid verification mode, corresponding negotiation is performed once, to determine a set of units on which the first unit and the remote attestation device are respectively responsible for performing trusted verification. In another case, negotiation may also be performed only once, and the determined verification permission may be stored, so that when the hybrid verification mode is used again later, the previously stored verification permission may be directly invoked for remote attestation. In still another case, negotiation may alternatively be performed periodically. In other words, a negotiation period (for example, seven days) is preset, and negotiation is performed once in each negotiation period, to determine the set of units on which the first unit and the remote attestation device are respectively responsible for performing trusted verification. The set of units is used as a basis for division of labor when the remote attestation device and the first unit perform remote attestation on each unit of the combined device in the negotiation period.

It can be understood that, in an actual remote attestation mode negotiation process, in addition to the implementations shown in FIG. 4 and FIG. 5, the remote attestation mode may be further negotiated about through a plurality of times of complex interaction between the first unit and the remote attestation device. To describe more clearly a possible implementation of negotiating about the remote attestation mode through a plurality of times of interaction in an actual communication process, the following describes, by using FIG. 8 and FIG. 9 as an example, a plurality of cases that may occur in a process in which the first unit and the remote attestation device negotiate about the remote attestation mode.

Figure 8:
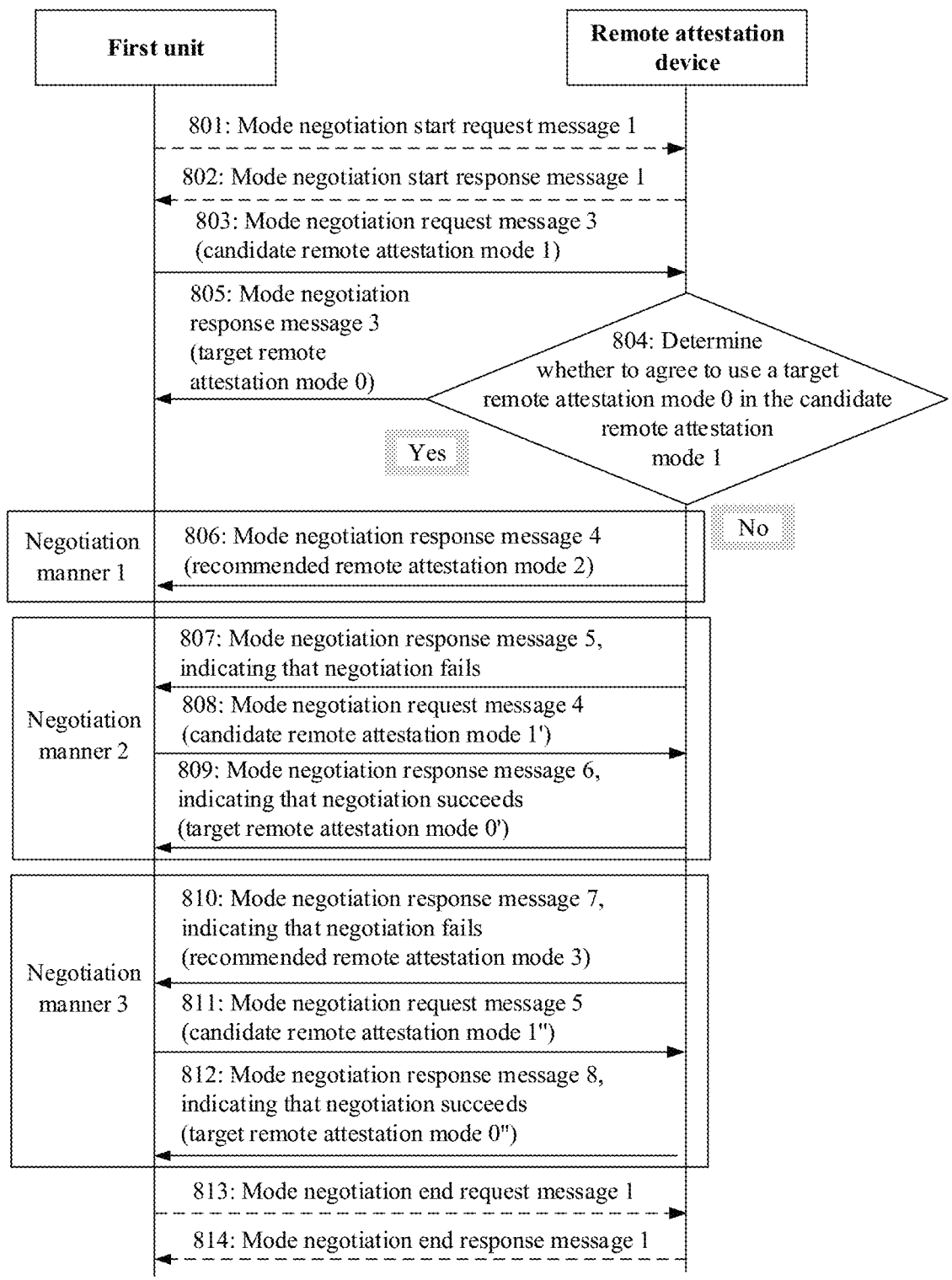
FIG. 8 is a signaling flowchart of an example of a remote attestation mode negotiation method for a combined device according to an embodiment of this application.

Refer to FIG. 8. When a remote attestation device determines a to-be-used target remote attestation mode, a remote attestation mode negotiation method provided in this embodiment of this application may include, for example, the following steps.

Step 801: A first unit sends a mode negotiation start request message 1 to the remote attestation device.

It can be understood that, the mode negotiation start request message 1 does not include specific content of negotiating about the remote attestation mode, and is only used to notify the remote attestation device that the first unit wants to start negotiating about the remote attestation mode with the remote attestation device, and requests the remote attestation device to start negotiating the remote attestation mode.

Step 802: The remote attestation device sends a mode negotiation start response message 1 to the first unit.

It can be understood that, the mode negotiation start response message 1 is used to indicate whether the remote attestation device agrees to start negotiating about the remote attestation mode with the first unit. If the remote attestation device agrees to start negotiating about the remote attestation mode with the first unit, the following steps are performed, or if the remote attestation device does not agree to start negotiating about the remote attestation mode with the first unit, current negotiation is terminated, and subsequent steps are not performed.

It should be noted that, step 801 and step 802 are steps that may be optionally performed in this embodiment.

Step 803: The first unit sends a mode negotiation request message 3 to the remote attestation device.

It can be understood that, the mode negotiation request message 3 includes a candidate remote attestation mode 1 recommended by the first unit for use. The candidate remote attestation mode 1 may be a remote attestation mode most desired by the first unit, or may be a plurality of remote attestation modes supported by the first unit.

When the mode negotiation request message 3 carries a plurality of candidate remote attestation modes 1, the mode negotiation request message 3 may further include a use priority corresponding to each candidate remote attestation mode 1. The use priority may be flexibly defined for each candidate remote attestation mode 1 based on a load situation of the remote attestation device and an actual condition of a subsidiary unit in a combined device. For example, it is assumed that three candidate remote attestation modes 1 are sequentially included in the mode negotiation request message 3 in a front-to-back sequence: a proxy mode, a hybrid verification mode, and a relay mode. In this case, use priorities corresponding to the candidate remote attestation modes 1 may be proxy mode>hybrid verification mode>relay mode in a descending order, or may be proxy mode<hybrid verification mode<relay mode. In a specific implementation, the use priority may be explicitly indicated by using a separate priority field, and a value type in the priority field may be an integer value type (for example, a larger number indicates a higher priority, or a larger number indicates a lower priority), a character string type, or the like.

Step 804: The remote attestation device determines whether to agree to use a target remote attestation mode 0 in the candidate remote attestation mode 1, and performs step 805 if the remote attestation device agrees to use the target remote attestation mode 0, or if the remote attestation device does not agree to use the target remote attestation mode 0, may perform any step in the following process: step 806, step 807 to step 809, and step 810 to step 812.

Step 805: The remote attestation device sends a mode negotiation response message 3 to the first unit, to indicate that negotiation succeeds.

To represent the determined target remote attestation mode 0, the mode negotiation response message 3 may include a negotiation result field. A value of the field is not only used to indicate that a negotiation result is that negotiation succeeds, but also may be used to indicate that the remote attestation device agrees to use the remote attestation mode 0.

It should be noted that, when the candidate remote attestation mode 1 in the mode negotiation request message 3 includes only the target remote attestation mode 0, the value of the negotiation result field in the mode negotiation response message 3 may be only used to indicate that the negotiation result is that negotiation succeeds, it does not need to indicate that the remote attestation device agrees to use the remote attestation mode 0.

If the remote attestation device does not agree to use the candidate remote attestation mode 1 for subsequent remote attestation, it may be considered that negotiation fails, the following three possible implementations may be included.

In a possible implementation, step 806 may be performed.

Step 806: The remote attestation device sends a mode negotiation response message 4 to the first unit.

The mode negotiation response message 4 carries a negotiation result field, and a value of the negotiation result field is not only used to indicate that a negotiation result is that negotiation fails, but also may be used to indicate a remote attestation mode 2 recommended by the remote attestation device for use.

It can be understood that, after the first unit receives the mode negotiation response message 4, if the first unit agrees about the remote attestation mode 2, the first unit considers that negotiation succeeds, and uses the remote attestation mode 2 to perform remote attestation. If the remote attestation device does not receive a new mode negotiation request message after step 806, the remote attestation device may also consider that negotiation succeeds, and use the remote attestation mode 2 for subsequent remote attestation.

In another possible implementation, step 807 to step 809 may be performed.

Step 807: The remote attestation device sends a mode negotiation response message 5 to the first unit, to indicate that negotiation fails.

The mode negotiation response message 5 carries a negotiation result field, and a value of the negotiation result field may only be used to indicate that a negotiation result is that negotiation fails. However, the mode negotiation response message 5 may not include specific content of a remote attestation mode, and is only used to notify the first unit that the previous negotiation fails.

Step 808: The first unit sends a mode negotiation request message 4 to the remote attestation device.

It can be understood that, the mode negotiation request message 4 includes a candidate remote attestation mode 1' that is newly provided by the first unit and that is recommended for use.

Step 809: The remote attestation device sends a mode negotiation response message 6 to the first unit, where the mode negotiation response message 6 carries a target remote attestation mode 0' determined from the candidate remote attestation mode 1', and is used to indicate that negotiation succeeds.

It should be noted that, for related descriptions of step 808 and step 809, refer to related descriptions of step 803 to step 805.

In still another possible implementation, step 810 to step 812 may be performed.

Step 810: The remote attestation device sends a mode negotiation response message 7 to the first unit, to indicate that negotiation fails.

The mode negotiation response message 7 carries a negotiation result field, and a value of the negotiation result field is not only used to indicate that a negotiation result is that negotiation fails, but also may be used to indicate a remote attestation mode 3 recommended by the remote attestation device for use.

Step 811: The first unit sends a mode negotiation request message 5 to the remote attestation device.

It can be understood that, the mode negotiation request message 5 includes a candidate remote attestation mode 1" that is newly provided and that is recommended for use by the first unit with reference to the remote attestation mode 3 recommended by the remote attestation device for use.

Step 812: The remote attestation device sends a mode negotiation response message 8 to the first unit, where the mode negotiation response message 8 carries a target remote attestation mode 0" determined from the candidate remote attestation mode 1", and is used to indicate that negotiation succeeds.

It should be noted that, for related descriptions of step 811 and step 812, also refer to related descriptions of step 803 to step 805.

In this way, after initial negotiation about the remote attestation mode fails, negotiation about the remote attestation mode may be continued by using the foregoing three specific implementations, until the remote attestation device determines the target remote attestation mode that is agreed on by the remote attestation device and the first unit for use, to provide a prerequisite for subsequently and sequentially performing remote attestation provided in this embodiment of this application.

Optionally, this embodiment of this application may further include the following.

Step 813: The first unit sends a mode negotiation end request message 1 to the remote attestation device, to notify the remote attestation device that a mode negotiation procedure ends.

Step 814: The remote attestation device returns a negotiation end response message 1 to the first unit.

The mode negotiation end request message 1 may include a negotiation result of current negotiation, for example, a negotiation success or a negotiation failure. If the negotiation result is that negotiation succeeds, the mode negotiation end response message 1 may further include a target remote mode determined through negotiation, or may include the target remote mode determined through negotiation and identification information 11 of a subsidiary unit 21 on which the first unit performs trusted verification. The remote attestation device may determine, based on content of the mode negotiation end request message 1, whether related information such as the negotiation result sent by the first unit is the same as related information such as a negotiation result determined by the remote attestation device, obtain a comparison result, and use the mode negotiation end response message 1 to carry the comparison result. If the comparison result indicates that the remote attestation device and the first unit determine same related information such as the negotiation result, it is considered that negotiation succeeds, or if the comparison result indicates that the remote attestation device and the first unit determine different related information such as the negotiation result, it is considered that negotiation fails.

It can be learned that, in step 801 to step 814, the remote attestation device determines, through negotiation, a remote attestation mode to be used in a remote attestation process of the combined device, and provides a data basis for sequentially performing a remote attestation method provided in this embodiment of this application.

Figure 9:
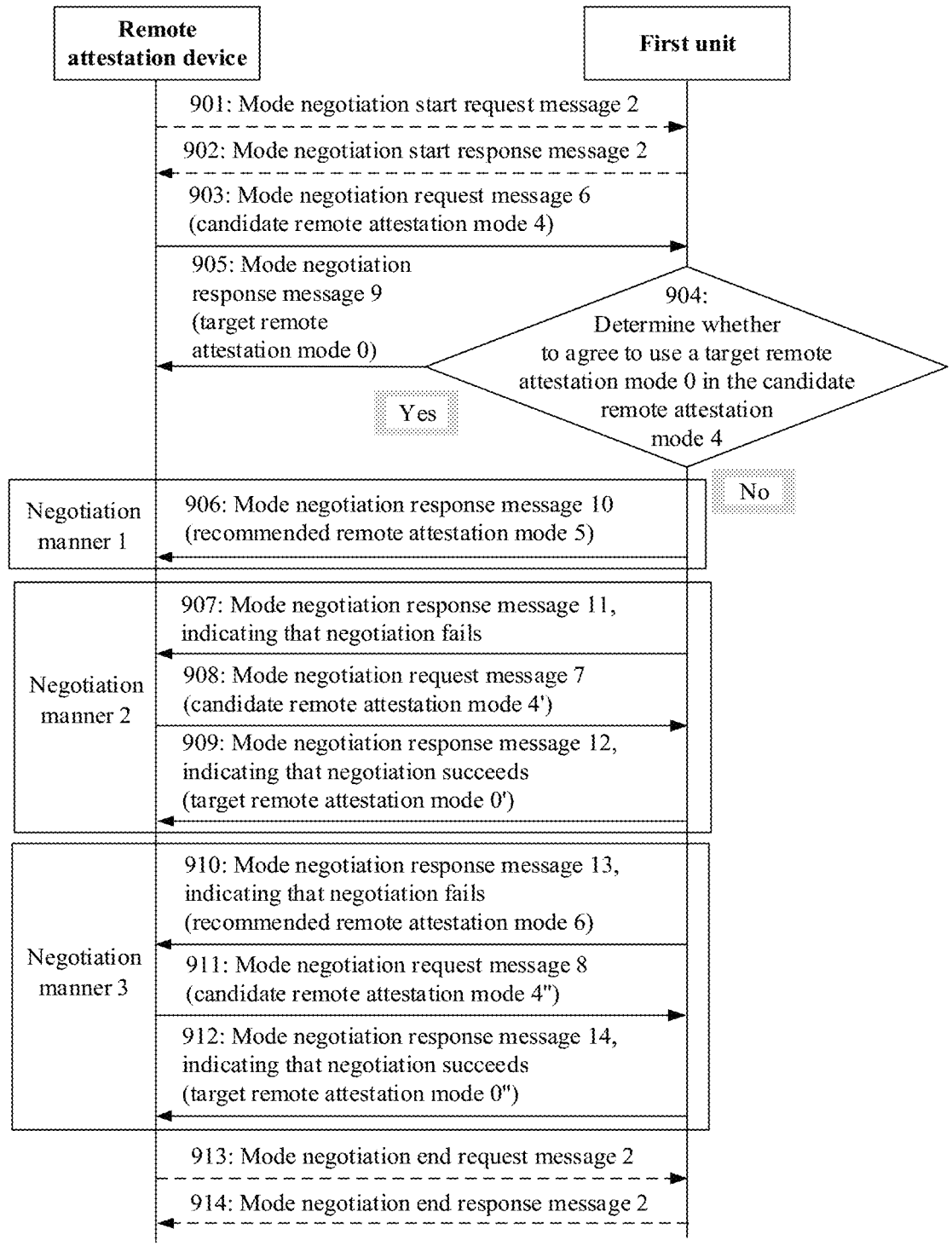
FIG. 9 is a signaling flowchart of another example of a remote attestation mode negotiation method for a combined device according to an embodiment of this application.

Refer to FIG. 9. When a first unit determines a to-be-used target remote attestation mode, a remote attestation mode negotiation method provided in this embodiment of this application may include, for example, the following steps.

Step 901: A remote attestation device sends a mode negotiation start request message 2 to the first unit.

Step 902: The first unit sends a mode negotiation start response message 2 to the remote attestation device.

It should be noted that, step 901 and step 902 are steps that may be optionally performed in this embodiment.

Step 903: The remote attestation device sends a mode negotiation request message 6 to the first unit.

Step 904: The first unit determines whether to agree to use a target remote attestation mode 0 in a candidate remote attestation mode 4, and performs step 905 if the first unit agrees to use the target remote attestation mode 0, or if the first unit does not agree to use the target remote attestation mode 0, may perform any step in the following process: step 906, step 907 to step 909, and step 910 to step 912.

Step 905: The first unit sends a mode negotiation response message 9 to the remote attestation device, to indicate that negotiation succeeds.

If the first unit does not agree to use a candidate remote attestation mode 1 for subsequent remote attestation, it may be considered that negotiation fails, the following three possible implementations may be included.

In a possible implementation, step 906 may be performed.

Step 906: The first unit sends a mode negotiation response message 10 to the remote attestation device, where the mode negotiation response message 10 carries a remote attestation mode 5 that is recommended for use.

In another possible implementation, step 907 to step 909 may be performed.

Step 907: The first unit sends a mode negotiation response message 11 to the remote attestation device, to indicate that negotiation fails.

Step 908: The remote attestation device sends a mode negotiation request message 7 to the first unit, where the mode negotiation request message 7 carries a candidate remote attestation mode 4' that is newly provided by the remote attestation device and that is recommended for use.

Step 909: The first unit sends a mode negotiation response message 12 to the remote attestation device, where the mode negotiation response message 12 carries a target remote attestation mode 0' determined from the candidate remote attestation mode 4', and is used to indicate that negotiation succeeds.

In still another possible implementation, step 910 to step 912 may be performed.

Step 910: The first unit sends a mode negotiation response message 13 to the remote attestation device, to indicate that negotiation fails and provide a remote attestation mode 6 recommended by the first unit for use.

Step 911: The remote attestation device sends a mode negotiation request message 8 to the first unit, where the mode negotiation request message 8 carries a candidate remote attestation mode 4" that is newly provided by the remote attestation device and that is recommended for use.

Step 912: The first unit sends a mode negotiation response message 14 to the remote attestation device, where the mode negotiation response message 14 carries a target remote attestation mode 0" determined from a candidate remote attestation mode 1", and is used to indicate that negotiation succeeds.

Optionally, this embodiment of this application may further include the following.

Step 913: The remote attestation device sends a mode negotiation end request message 2 to the first unit, to notify the first unit that a mode negotiation procedure ends.

Step 914: The first unit returns a negotiation end response message 2 to the remote attestation device.

It should be noted that, for implementations of step 901 to step 914 and related descriptions, refer to step 801 to step 814 in FIG. 8. Details are not described herein again.

It can be learned that, in step 901 to step 914, a first unit in a combined device determines, through negotiation, a remote attestation mode to be used in a remote attestation process of the combined device, and provides a data basis for sequentially performing a remote attestation method provided in this embodiment of this application.

In addition to the remote attestation mode negotiation manner provided in this embodiment of this application, the target remote attestation mode may be determined in the following two manners.

In manner 1, on the combined device and the remote attestation device, a third party device (for example, a controller or a network management server) may determine and configure the target remote attestation mode on the combined device and the remote attestation device, to indicate that the combined device and the remote attestation device perform remote attestation on the combined device in the target remote attestation mode. In a case, the third party device may separately deliver the determined target remote attestation mode to the combined device and the remote attestation device. In another case, the third party device may alternatively deliver the determined target remote attestation mode to the remote attestation device, and then the remote attestation device sends the determined target remote attestation mode to the combined device. In still another case, the third party device may alternatively deliver the determined target remote attestation mode to the combined device, and then the combined device sends the determined target remote attestation mode to the remote attestation device. Between the third party device and the remote attestation device, between the third party device and the combined device, and between the combined device and the remote attestation device, the determined remote attestation mode may be delivered by using an NETCONF message.

In manner 2, the target remote attestation mode may alternatively not be determined in advance, and instead, may be determined, by using an exchanged message, when the remote attestation device and the first unit perform remote attestation. For example, if a message sent by the first unit to the remote attestation device carries trusted verification results of all the other units, it may be considered that a proxy mode is used between the first unit and the remote attestation device. Therefore, the proxy mode is determined as a target remote verification mode to be used between the first unit and the remote verification device. For another example, if a message sent by the first unit to the remote attestation device carries measurement information of all the other units, it may be considered that a relay mode is used between the first unit and the remote attestation device. Therefore, the relay mode is determined as a target remote attestation mode to be used between the first unit and the remote attestation device. For still another example, if a message sent by the first unit to the remote attestation device carries measurement information of a set of some units and trusted verification results of the other units, it may be considered that a hybrid verification mode is used between the first unit and the remote attestation device. Therefore, the hybrid verification mode is determined as a target remote verification mode to be used between the first unit and the remote verification device.

Figure 10:
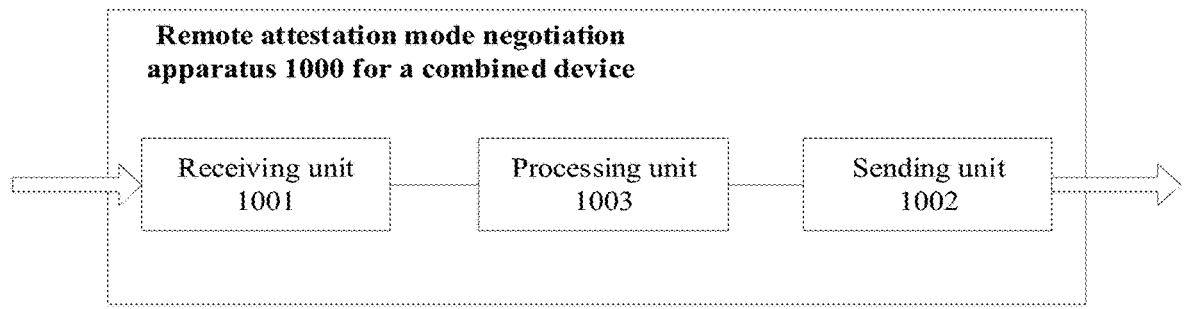
FIG. 10 is a schematic diagram of a structure of a remote attestation mode negotiation apparatus for a combined device according to an embodiment of this application.

In addition, an embodiment of this application further provides a remote attestation mode negotiation apparatus 1000 for a combined device, as shown in FIG. 10. The apparatus 1000 is applied to the combined device, and the combined device includes a receiving unit 1001, a sending unit 1002, and a processing unit 1003. The receiving unit 1001 is configured to perform a receiving operation performed by the combined device in the methods corresponding to the embodiments shown in FIG. 4, FIG. 6, FIG. 8, and FIG. 9, for example, perform step 402 in the embodiment shown in FIG. 4. The sending unit 1002 is configured to perform a sending operation performed by the combined device in the methods corresponding to the embodiments shown in FIG. 4, FIG. 6, FIG. 8, and FIG. 9, for example, perform step 401 in the embodiment shown in FIG. 4. The processing unit 1003 is configured to perform an operation that is different from the receiving operation and the sending operation and that is performed by the combined device in the methods corresponding to the embodiments shown in FIG. 4, FIG. 6, FIG. 8, and FIG. 9. For example, the processing unit 1003 may perform step 403 in the embodiment shown in FIG. 4, to be specific, determine a target remote attestation mode based on a mode negotiation response message 1.

Figure 11:
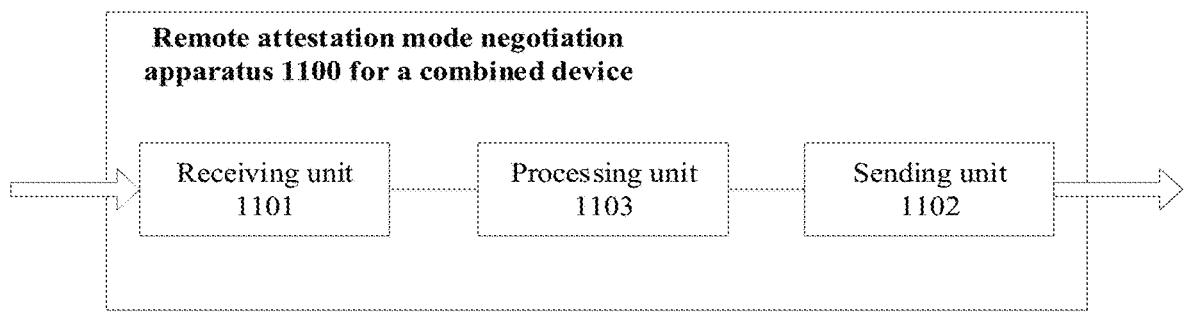
FIG. 11 is a schematic diagram of a structure of another remote attestation mode negotiation apparatus for a combined device according to an embodiment of this application.

In addition, an embodiment of this application further provides a remote attestation apparatus 1100 for a combined device, as shown in FIG. 11. The apparatus 1100 is applied to a remote attestation device, and the remote attestation device includes a receiving unit 1101, a sending unit 1102, and a processing unit 1103. The receiving unit 1101 is configured to perform a receiving operation performed by the remote attestation device in the methods corresponding to the embodiments shown in FIG. 5, FIG. 7, FIG. 8, and FIG. 9, for example, perform step 502 in the embodiment shown in FIG. 5. The sending unit 1102 is configured to perform a sending operation performed by the remote attestation device in the methods corresponding to the embodiments shown in FIG. 5, FIG. 7, FIG. 8, and FIG. 9, for example, perform step 501 in the embodiment shown in FIG. 5. The processing unit 1103 is configured to perform an operation that is different from the receiving operation and the sending operation and that is performed by the remote attestation device in the methods corresponding to the embodiments shown in FIG. 5, FIG. 7, FIG. 8, and FIG. 9. For example, the processing unit 1103 may perform step 503 in the embodiment shown in FIG. 5.

Figure 12:
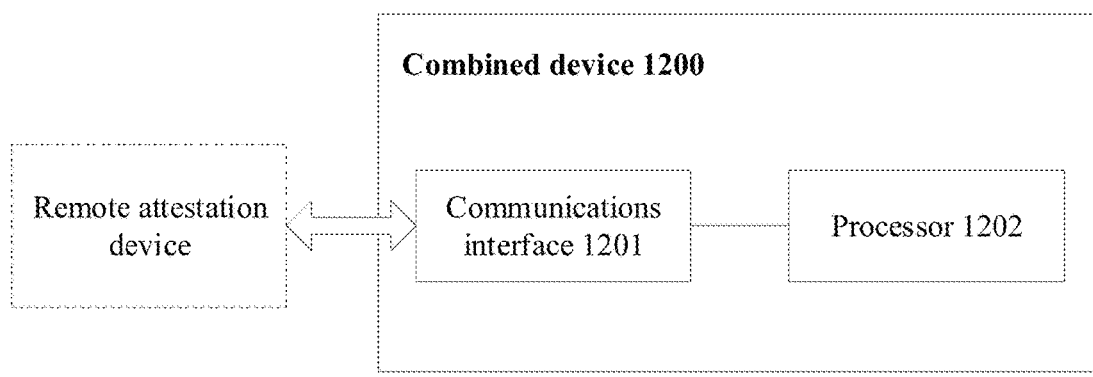
FIG. 12 is a schematic diagram of a structure of a combined device according to an embodiment of this application.

In addition, an embodiment of this application further provides a combined device 1200. As shown in FIG. 12, the combined device 1200 may include a communications interface 1201 and a processor 1202. The communications interface 1201 is configured to perform a receiving operation and a sending operation in the embodiments shown in FIG. 4, FIG. 6, FIG. 8, and FIG. 9. The processor 1202 is configured to perform an operation other than the receiving operation and the sending operation in the embodiments shown in FIG. 4, FIG. 6, FIG. 8, and FIG. 9, for example, perform step 403 in the embodiment shown in FIG. 4.

Figure 13:
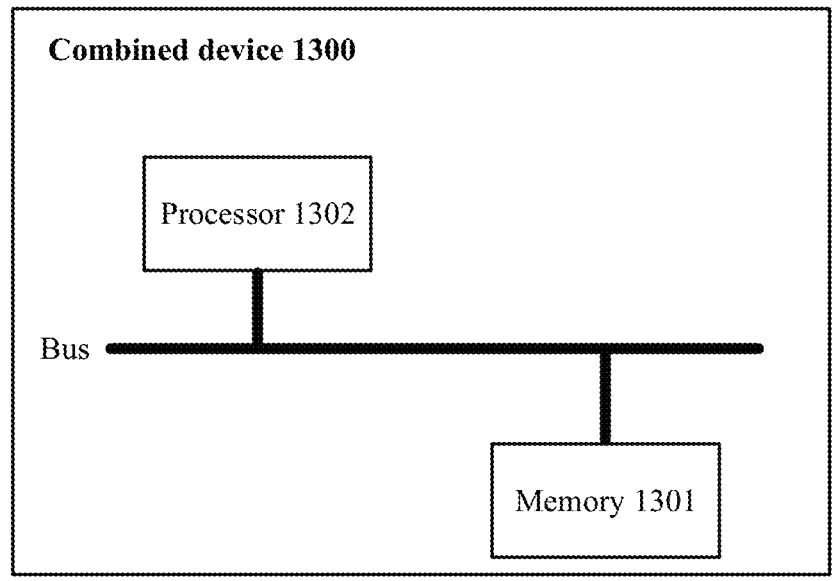
FIG. 13 is a schematic diagram of a structure of another combined device according to an embodiment of this application.

In addition, an embodiment of this application further provides a combined device 1300. As shown in FIG. 13, the combined device 1300 includes a memory 1301 and a processor 1302. The memory 1301 is configured to store program code. The processor 1302 is configured to execute instructions in the program code, so that the combined device 1300 performs the methods provided in the embodiments shown in FIG. 4, FIG. 6, FIG. 8, and FIG. 9.

Figure 14:
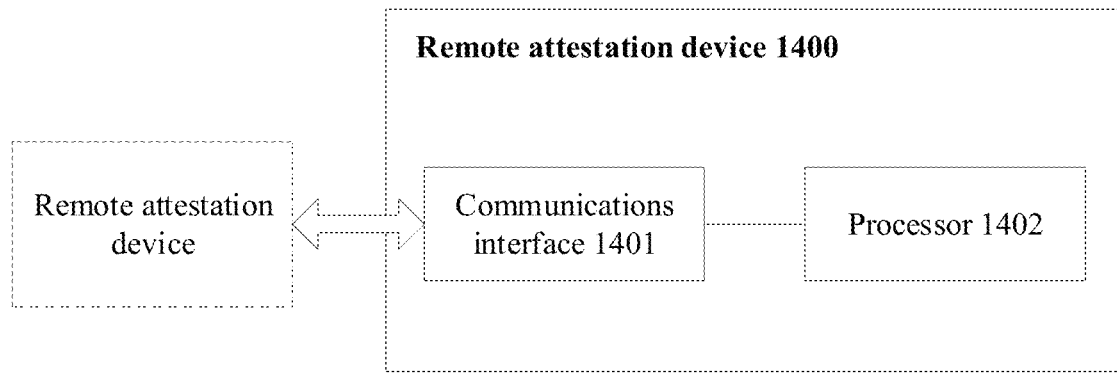
FIG. 14 is a schematic diagram of a structure of a remote attestation device according to an embodiment of this application.

In addition, an embodiment of this application further provides a remote attestation device 1400. As shown in FIG. 14, the remote attestation device 1400 includes a communications interface 1401 and a processor 1402. The communications interface 1401 is configured to perform a receiving operation and a sending operation in the embodiments shown in FIG. 5, FIG. 7, FIG. 8, and FIG. 9. The processor 1402 is configured to perform an operation other than the receiving operation and the sending operation in the embodiments shown in FIG. 5, FIG. 7, FIG. 8, and FIG. 9, for example, perform step 503 in the embodiment shown in FIG. 5.

Figure 15:
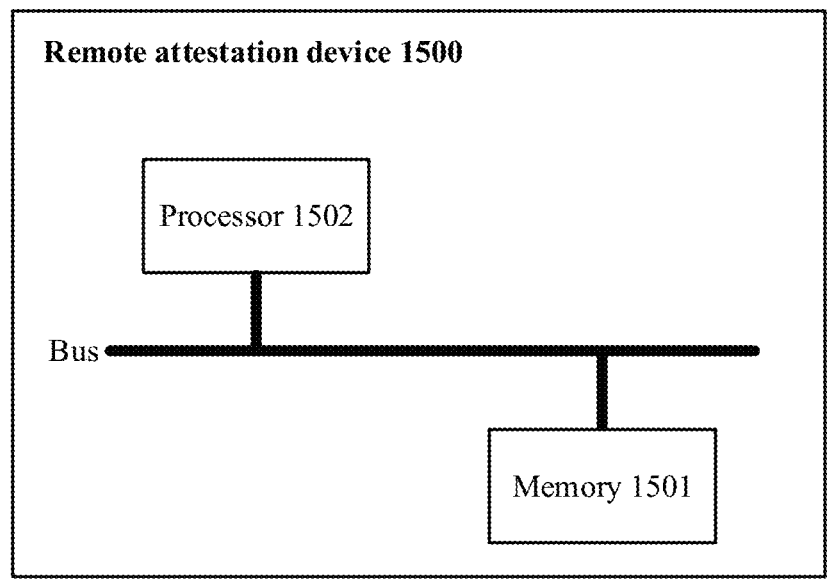
FIG. 15 is a schematic diagram of a structure of another remote attestation device according to an embodiment of this application.

In addition, an embodiment of this application further provides a remote attestation device 1500. As shown in FIG. 15, the remote attestation device 1500 includes a memory 1501 and a processor 1502. The memory 1501 is configured to store program code. The processor 1502 is configured to execute instructions in the program code, so that the remote attestation device 1500 performs the methods provided in the embodiments shown in FIG. 5, FIG. 7, FIG. 8, and FIG. 9.

It can be understood that, in the foregoing embodiment, the processor may be a CPU, a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor may be one processor, or may include a plurality of processors. The memory may be a volatile memory such as a random-access memory (RAM), a non-volatile memory such as a read-only memory (ROM), a flash memory, a hard disk drive (HDD), or a solid-state drive (SSD), or a combination of the foregoing types of memories. The memory may be one memory, or may include a plurality of memories. In a specific implementation, the memory stores computer-readable instructions, and the computer-readable instructions include a plurality of software modules, for example, a sending module, a processing module, and a receiving module. After executing each software module, the processor may perform a corresponding operation based on an indication of each software module. In this embodiment, an operation performed by a software module is actually an operation performed by the processor based on an indication of the software module. After executing the computer-readable instructions in the memory, the processor may perform, based on an indication of the computer-readable instructions, all operations that can be performed by the combined device or the remote attestation device.

It can be understood that, in the foregoing embodiments, the communications interface 1201/1401 of the combined device 1200/remote attestation device 1400 may be further used as the receiving unit 1001/1002 and the sending unit 1101/1102 in the remote attestation apparatus 1000/1100 for the combined device, to implement data communication between the combined device 1200 and the remote attestation 1400.

In addition, an embodiment of this application further provides a computer-readable storage medium. The computer-readable storage medium stores instructions. When the instructions run on a computer, the computer is enabled to perform the remote attestation method for a combined device provided in the embodiments shown in FIG. 4 to FIG. 9.

In addition, an embodiment of this application further provides a computer program product. When the computer program product runs on a computer, the computer is enabled to perform the remote attestation method for a combined device provided in the embodiments shown in FIG. 4 to FIG. 9.

The word "first" in a name such as "first unit" or a "first request message" mentioned in the embodiments of this application is merely used as a name identifier, and does not mean being the first in a sequence. This rule is also applicable to "second" and the like.

It can be learned from the foregoing descriptions of the implementations that, a person skilled in the art may clearly understand that a part or all of the steps of the methods in the foregoing embodiments may be implemented by using software and a universal hardware platform. Based on such an understanding, the technical solutions of this application may be implemented in a form of a software product. The computer software product may be stored in a storage medium, for example, a ROM/RAM, a magnetic disk, or an optical disc, and include several instructions for instructing a computer device (which may be a personal computer, a server, or a network communication device such as a router) to perform the methods described in embodiments or some parts of embodiments of this application.

Embodiments in this specification are all described in a progressive manner, for same or similar parts in the embodiments, refer to these embodiments, and each embodiment focuses on a difference from other embodiments. Especially, apparatus and device embodiments are basically similar to a method embodiment, and therefore is described briefly. For related parts, refer to partial descriptions in the method embodiment. The described device and apparatus embodiments are merely examples. The modules described as separate parts may or may not be physically separate, and parts displayed as modules may or may not be physical modules, may be located in one position, or may be distributed on a plurality of network units. Some or all the modules may be selected according to an actual need to achieve the objectives of the solutions of the embodiments. A person of ordinary skill in the art may understand and implement embodiments of the present disclosure without creative efforts.

The foregoing descriptions are merely example implementations of this application, but are not intended to limit the protection scope of this application. It should be noted that a person of ordinary skill in the art may make several improvements and polishing without departing from this application, and the improvements and polishing shall fall within the protection scope of this application.

What is claimed is:

1. A combined device comprising:
a first communication entity configured to:
send, to a remote attestation device, a mode negotiation request message;
receive, from the remote attestation device in response to the mode negotiation request message, a mode negotiation response message; and
determine, based on the mode negotiation response message, a target remote attestation mode, wherein the target remote attestation mode is a proxy mode, and wherein the first communication entity is further configured to perform trusted verification on all communication entities in the combined device that comprise a trusted computing base (TCB) and that are different from the first communication entity.

2. The combined device of claim 1, wherein the first communication entity is configured to send the mode negotiation request message during a boot process of the combined device.

3. The combined device of claim 1, wherein the first communication entity is further configured to:
send, to the remote attestation device, a first request message requesting verification permission from the remote attestation device, wherein the verification permission indicates a set of communication entities on which the first communication entity performs trusted verification; and
receive, from the remote attestation device, a first response message indicating the verification permission.

4. The combined device of claim 1, wherein the mode negotiation response message carries the target remote attestation mode.

5. The combined device of claim 1, wherein the mode negotiation request message carries a candidate remote attestation mode.

6. The combined device of claim 5, wherein the candidate remote attestation mode comprises at least one of a relay mode, a proxy mode, or a hybrid verification mode.

7. A remote attestation device comprising:
a communications interface; and
a processor coupled to the communications interface and configured to:
receive, using the communications interface and from a combined device, a mode negotiation request message; and
send, using the communications interface, to the combined device, and in response to the mode negotiation request message, a mode negotiation response message comprising a target remote attestation mode, wherein the target remote attestation mode is a hybrid verification mode and enables a first communication entity of the combined device to perform a first trusted verification on a second communication entity of the combined device, wherein the processor is further configured to perform a second trusted verification on a third communication entity, and wherein each of the second communication entity and the third communication entity comprises a trusted computing base (TCB).

8. The remote attestation device of claim 7, wherein the processor is further configured to:
receive, using the communications interface and from a first communication entity of the combined device, a first request message requesting verification permission from the remote attestation device, wherein the verification permission indicates a set of communication entities on which the first communication entity performs trusted verification; and send, using the communications interface and to the first communication entity, a first response message indicating the verification permission.

9. The remote attestation device of claim 7, wherein the mode negotiation request message carries a candidate remote attestation mode.

10. The remote attestation device of claim 9, wherein the candidate remote attestation mode comprises at least one of a relay mode, a proxy mode, or a hybrid verification mode.

11. A communications system comprising:
a combined device comprising a first communication entity configured to:
send a mode negotiation request message;
receive a mode negotiation response message in response to the mode negotiation request message, wherein the mode negotiation response message comprises a target remote attestation mode; and
determine, based on the mode negotiation response message, the target remote attestation mode, wherein the target remote attestation mode is a relay mode, wherein the first communication entity is further configured to send, to a remote attestation device, measurement information of all communication entities in the combined device that comprise a trusted computing base (TCB) to enable the remote attestation device to perform trusted verification on each of the communication entities; and
the remote attestation device configured to:
receive, from the first communication entity, the mode negotiation request message; and
send, to the first communication entity in response to the mode negotiation request message, the mode negotiation response message.

12. The communications system of claim 11, wherein the first communication entity is configured to send the mode negotiation request message during a boot process of the combined device.

13. The communications system of claim 11, wherein the remote attestation device is further configured to:
receive, from the first communication entity, a first request message requesting verification permission from the remote attestation device, wherein the verification permission indicates a set of communication entities on which the first communication entity performs trusted verification; and
send, to the first communication entity, a first response message indicating the verification permission.

14. The communications system of claim 11, wherein the mode negotiation response message carries the target remote attestation mode.

15. The communications system of claim 11, wherein the mode negotiation request message carries a candidate remote attestation mode.

16. The communications system of claim 15, wherein the candidate remote attestation mode comprises at least one of a relay mode, a proxy mode, or a hybrid verification mode.

* * * * *